Nov. 26, 1940.     J. M. KING     2,222,907
FLUID MIXING VALVE
Filed Oct. 16, 1933     4 Sheets-Sheet 4
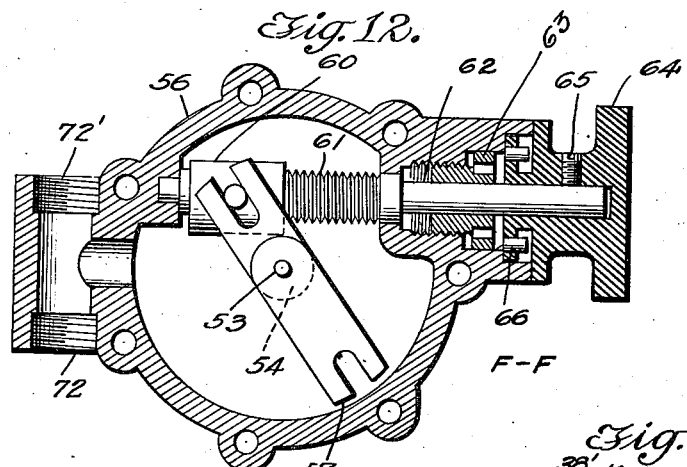
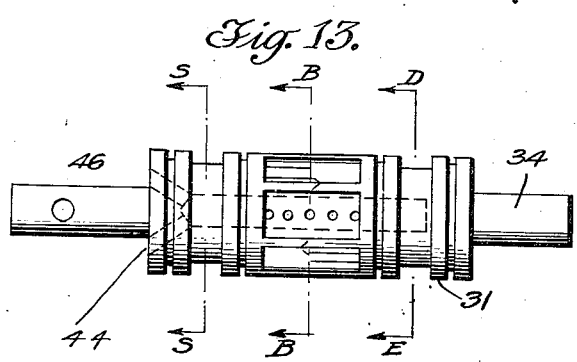
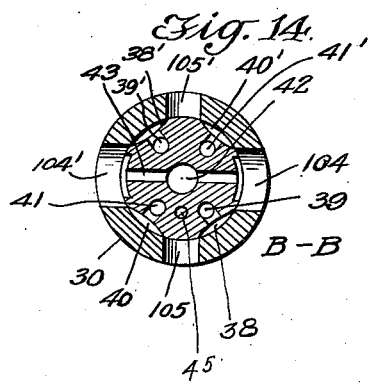
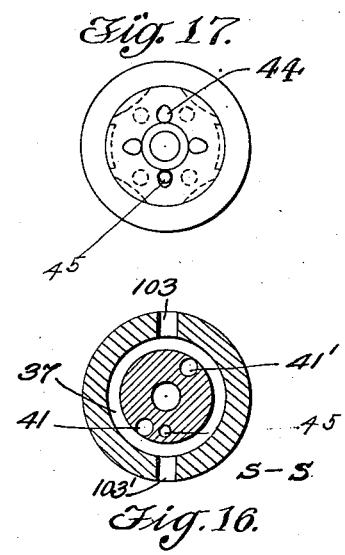
INVENTOR.
Joseph Marion King Patented Nov. 26, 1940

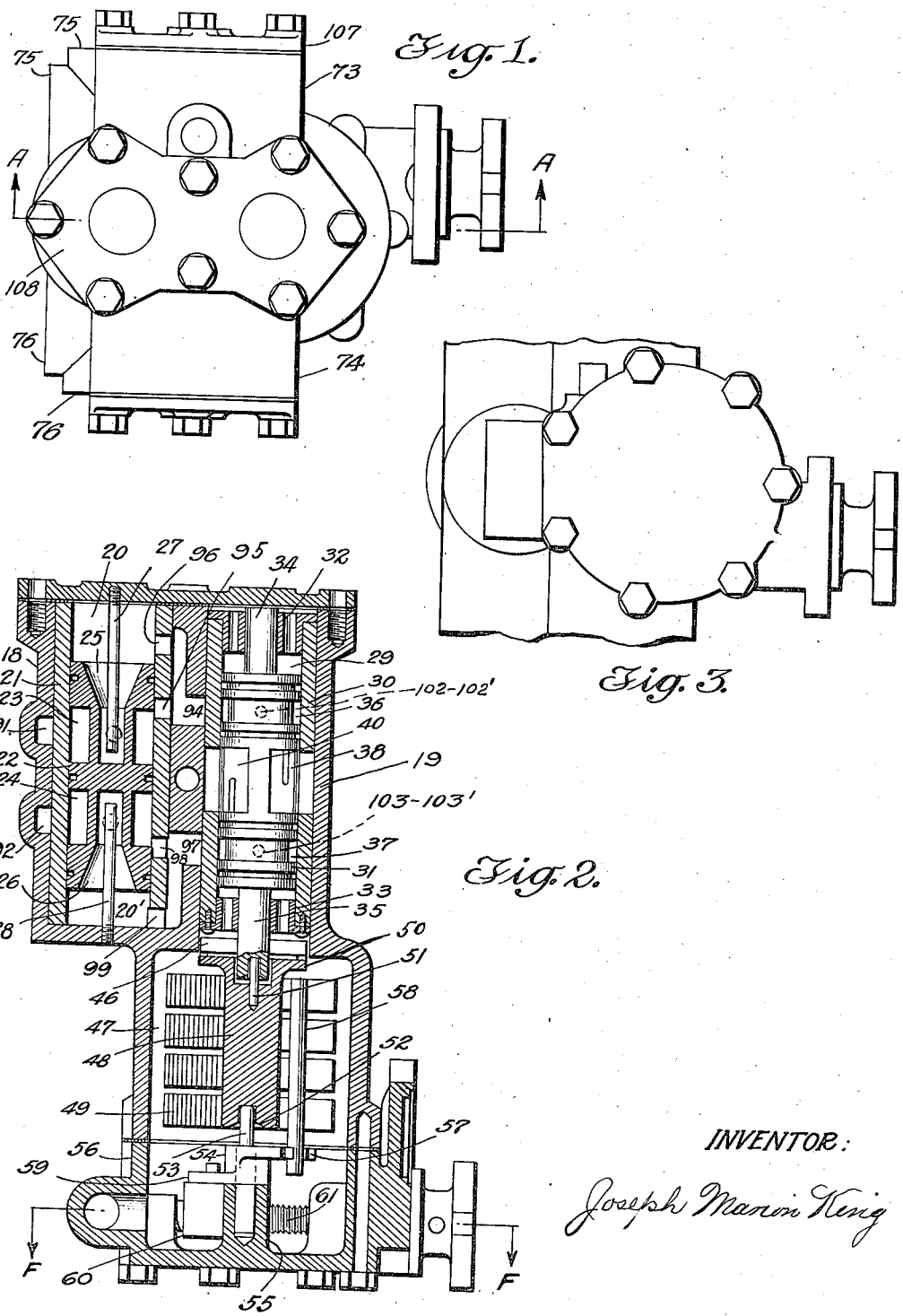

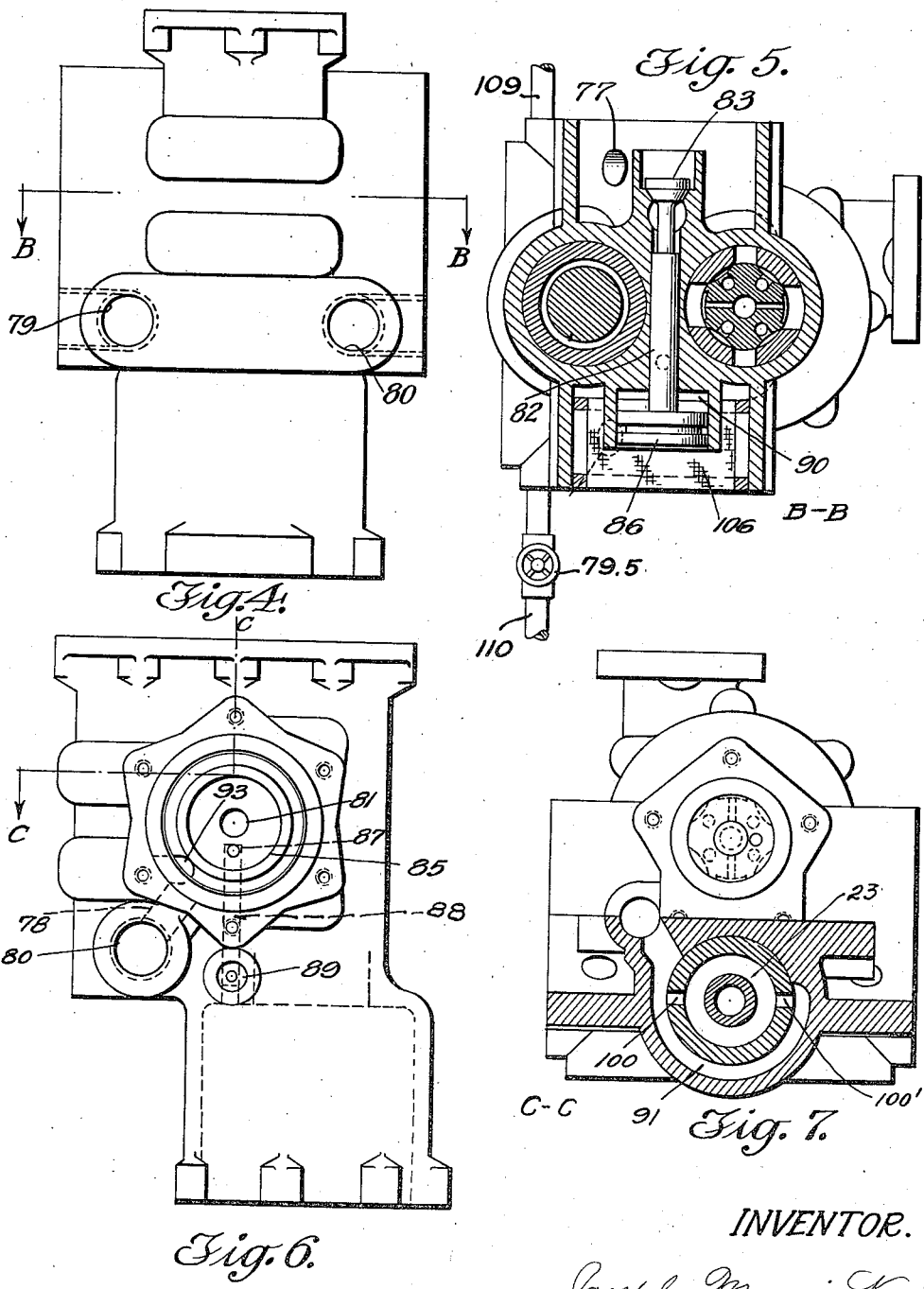

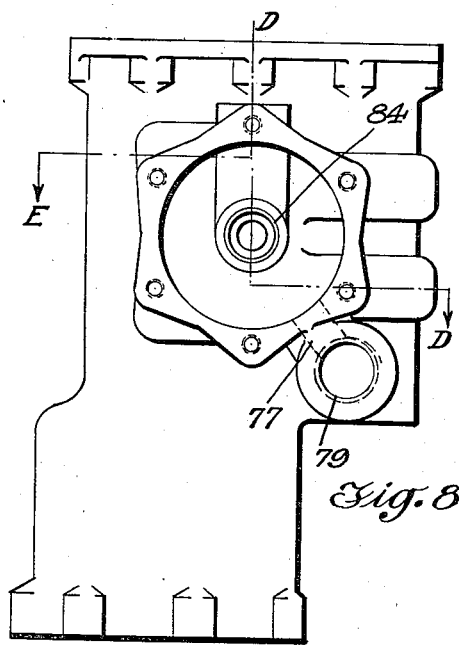
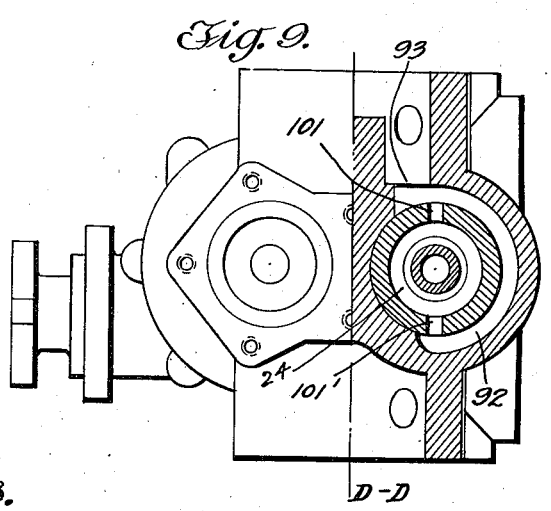
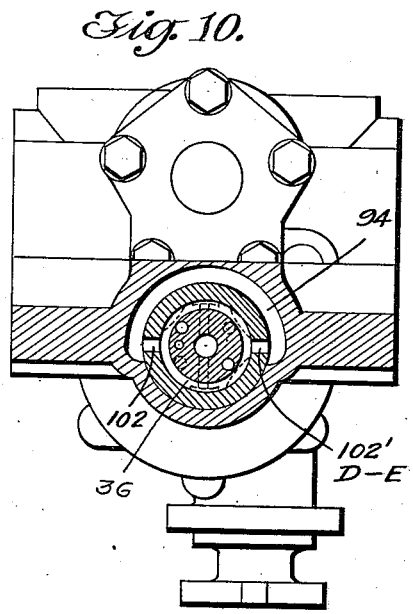
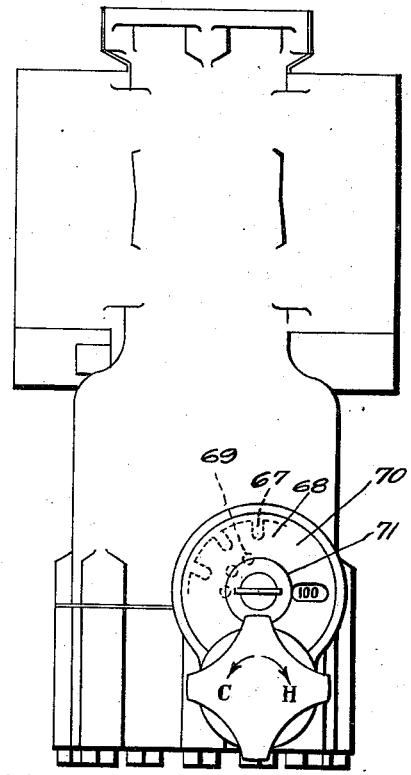
INVENTOR.
Joseph Marion King

2,222,907

UNITED STATES PATENT OFFICE 2,222,907

FLUID MIXING VALVE

Joseph Marion King, Detroit, Mich.

Application October 16, 1933, Serial No. 693,845

7 Claims. (Cl. 236—12)

My invention relates to hot-and-cold-water mixing-valves adapted to maintain an elective temperature by automatic control.

Some of the objects attained are the following:

Selective temperature by means of a calibrated dial; automatic maintenance of a predetermined temperature; admission and control of the flow of hot water in response to the pressure of cold water; the automatic equalization of varying pressure due to unlike static heads, faucet-flows in either or both lines, and "water-rams"; the instantaneous stoppage of the hot-water flow when the flow of the cold water ceases; the functioning of the flow solely by a control-valve, interposed in the inlet cold-water line connective with the said fluid-mixing-valve; simplicity of structure and economy and convenience of construction.

The invention contemplates a temperature-maintaining device, suitable for bath rooms where unchanging temperature is required for comfort—especially for shower baths; a device that will not, in consequence of sudden disturbance in the pressure of the lines, cause momentary changes in the temperature of the shower; a device that eliminates the possibility of burns and other serious injury during operation.

The invention comprehends a member adapted to cause and maintain an equality of pressure of fluid entering the said fluid-mixing-valve via a plurality of fluid conduits whose static heads are unlike; a rotative emitting-valve, coactively connected with a rotatively mounted thermostatic-member adapted to move in response to change of temperature; a mechanism to change the position of the said thermostatic-member; an exterior set-member, correlated with the said mechanism and a calibrated dial, by which the said dial may be set for a predetermined temperature.

The invention further comprehends all changes of temperature to be effected solely by the manipulating of the said set-member, and not by, as with other devices, the introducion of an independent cold-water line.

The invention consists in the construction and combination of parts hereinafter illustrated in the drawings, and more particularly described in the detailed specification and pointed out in the appended claims.

Throughout the various drawings, identical numerals designate identical parts.

The drawings:

Figure 1 is a plan view of a fluid automatic mixing-valve.

Figure 2 is a vertical section on the line A—A of Figure 1.

Figure 3 is a bottom view of the bottom inclosing-member illustrating the manner of attachment and shower exit-connections.

Figure 4 is a rear side elevation with covers and bottom enclosing-member removed.

Figure 5 is a cross section of a plan view on the line B—B of Figure 4.

Figure 6 is a side elevation with covers and bottom enclosing-member removed, illustrating a cold-water inlet, screen-chamber, and breather vent.

Figure 7 is a plan view in partial section on the line C—C of Figure 6 showing a cored channel in the casting for the flow of hot water and openings formed in a sleeve, leading therefrom to the chamber of a pressure-equalizing member.

Figure 8 is a side elevation with covers and bottom enclosing-member removed, illustrating a hot-water inlet, screen-chamber, and hot-water safety-valve seat.

Figure 9 is a plan view in partial section on the line D—D of Figure 8, showing a cored channel in the casting for the flow of cold water and openings formed in a sleeve, leading therefrom to the chamber of a pressure-equalizing member.

Figure 10 is a plan view in partial section on the line D—E of Figure 8, showing a cored channel in the casting for the flow of hot water from the chamber of the pressure-equalizing member, and openings formed in a sleeve, leading therefrom to a rotative emitting-valve.

Figure 11 is a front elevation illustrating a temperature, calibrated dial, and set-member.

Figure 12 is a cross sectional view on the line F—F of Figure 3 disclosing the construction of the mechanism by which the thermostatic-member is set for predetermined temperature.

Figure 13 is a view of a rotative emitting-valve horizontally shown, disclosing inlets to a central outlet opening, longitudinally formed in the member and shown by dotted lines.

Figure 14 is a cross sectional view on the line B—B of Figure 13 illustrating also sleeve openings.

Figure 15 is a cross sectional view on the line D—E of Figure 13 illustrating also sleeve openings.

Figure 16 is a cross sectional view on the line S—S of Figure 13 illustrating also sleeve openings.

Figure 17 is a bottom view of the rotative emitting-valve.

The device comprises two, approximately, cylindrical bodies 18 and 19 respectively, integrally formed. An annular opening 20 is formed in the portion 18, into which is pressed a suitably machined sleeve 21, adapted to contain a closely fitting pressure-equalizing member 22, cylindrical in form and movably related thereto. Two portions of the member 22 are reduced in diameter to form, in combination with the sleeve surface, chamber 23 for hot water and chamber 24 for cold water; recesses 25 and 26 are centrally, longitudinally formed in the member 22 to facilitate lightness and also termini for rod-stops 27 and 28 respectively. The description of the said equalizing-member, and the disclosure of its function and relation to the other members of the said mixing-valve indicate, clearly, its utility constituted in a separate unit; viz., where a number of mixing-valves are installed, a single unit comprising the equalizing-member, conveniently located, may serve a battery of valves.

An annular opening 29 is formed in the portion 19, into which is pressed a suitably machined sleeve 30 for the reception of a rotative emitting-valve member 31 designed to move freely in the said opening, concentrically positioned by means of closely fitting guides, 32 and 33 respectively. The said emitting-valve is cylindrical in form having an upper and lower guide-formed extensions 34 and 35 respectively. Two chambers 36 and 37 for hot water and cold water respectively are formed around the said emitting-valve by a reduction of its diameter at such points in combination with the surface of the sleeve 30. In approximately the mid-portion of the said emitting-valve are milled four circumferential places 38 and 38', for the passage of hot water from openings 39 and 39', and 40 and 40' for the passage of cold water from openings 41 and 41'. A longitudinal opening 42 is centrally formed in the said emitting-valve and made communicable with a series of inlet openings 43 laterally formed in the valve and adapted to constitute a fluid passage. The said opening 42 is provided with a plurality of outlets 44, shown by dotted lines. A longitudinal opening 45 is formed throughout the length of the said valve to provide an equilibrium of pressure.

Near the end of the guide-formed extension 35 of the said emitting-valve is laterally drilled an opening into which is mounted a carrier rod 46. An exit chamber 47 is formed concentrically, with the opening 29, for the installation of a thermostatic-member 48. The thermostatic-member comprises a cylindrical unit longitudinally grooved on one side, in which groove are mounted a plurality of spirally formed expansion coils 49. The upper end, 50, of the said thermostatic-member 48 is made larger in diameter, and centrally therein is formed a recess in which is fixedly mounted a bearing member 51, which is adapted to engage a bearing formed in the end of the extension 35. A lateral groove is milled in the upper end 50 to receive the carrier-rod 46, to provide coactive movement of the emitting-valve 31. A central recess is machined in the lower end 52 of the thermostatic-member 48 for the reception of a bearing member 53, the said member being a part of a carrier 54 concentric therewith, and mounted in a boss 55 formed centrally in the bottom wall of an inclosing-member 56.

The carrier-member 54 comprises two bifurcated extensions, one, 57 for the reception of a rod 58, to which is rigidly attached the expansion coils 49, the other, 59, being adapted to be moved by a traveler 60 actuated by a screw-member 61 laterally mounted in the said inclosing-member 56. An extension 62 of the screw-member passes through a recessed portion of the inclosing-member 56 and is designed to be held in fluid-tight relation with such recess by a packing-sleeve 63. A suitably designed set-member 64 is mounted on the extension 62 of the said screw-member and releasably fixed thereto by a set-screw 65. The said set-member is provided with a pair of teeth 66 adapted to contact with and engage openings 67 in a calibrated dial 68, shown by dotted lines, and effect an interrupted rotatory motion of the said dial. A series of annular openings 69 are formed in the said dial, which at intervals engage a spring-pressed ball (not shown) to insure positive stops of the said dial. A dial cover 70, with an opening through which the dial numbers are shown, encloses the said dial by means of a screw cap 71. Openings 72 and 72' are formed in the lower portion of the said inclosing-member for exit pipe connections.

On each side of the said mixing-valve is integrally formed a screen-chamber, 73 for hot water and 74 for cold water, the said screen-chambers being also integrally connective with inlet bosses, 75 for hot water and 76 for cold water; fluid passages 77 and 78 for hot water and cold water respectively are made communicable with the said screen-chambers and the hot-water inlet connection 79 and the cold-water connection 80.

Concentrically with the said screen-chambers on the line B—B of Figure 4 is laterally drilled through the body of the said mixing-valve a valve-stem opening 81 for the reception of a valve-stem 82, on the end of which is formed a hot-water safety-valve 83, adapted to engage a seat 84 formed in the hot water screen-chamber 73 and prevent the flow of hot water. An annular-chamber 85 is formed in the said cold-water screen-chamber, having an identical center with that of the said valve-stem opening, and therein movably mounted a valve-fitting piston 86, adapted to move inwardly when subjected to pressure in the said cold-water screen-chamber, and, when such pressure subsides, to move outwardly in response to pressure in the said hot-water screen-chamber. An escape vent 87 is laterally formed in the lower side of the annular-chamber 85 and made communicable with a vertical passage 88, shown in dotted lines, which connects with an atmospheric outlet 89. A rubber disk 90 having openings corresponding to those in the said annular-chamber is tightly mounted in the said annular-chamber to form a leak-proof seat for the said valve-fitting piston.

The flow of both the hot and cold water is caused and controlled solely by a control-valve 79.5 interposed in the cold-water line, connective with the inlet opening 80. The closing off of the cold water either by the control-valve referred to or by any other means causes the flow of hot water to instantly cease. When the cold-water pressure ceases, the hot-water flow is cut off by three valve actions, viz., the equalizing-member, the rotative emitting-member, and the hot-water safety-valve.

A channel 91 communicable with the hot-water screen-chamber 73 via the hot-water safety-valve seat 84, is cored in the body portion 18.

A channel 92 communicable with the cold-water screen-chamber via an inlet 93 is cored in the body portion 18. A channel 94, communicable via an opening 95 in the sleeve 21 with the hot-water chamber 23, and also connective with the opening 20 by an inlet 96 formed in the sleeve 21, is cored in the body portion 19.

A channel 97 communicable, via an opening 98 in the sleeve 21 with the cold-water chamber 24, and also connective with the opening 20' by an inlet 99 formed in the sleeve 21, is cored in the body portion 19.

Openings 100 and 100' are formed in the sleeve 21, communicable with channel 91 and chamber 23.

Openings 101 and 101' are formed in the sleeve 21, communicable with channel 92 and chamber 24.

Openings 102 and 102' are formed in the sleeve 30, communicable with channel 94 and hot-water chamber 36.

Openings 103 and 103' are formed in the sleeve 30, communicable with channel 97 and cold-water chamber 37.

Openings 39 and 39' of the emitting-valve 31 are made connective with the hot-water chamber 36 and the circumferential places 38 and 38'.

Openings 41 and 41' of the said emitting-valve are made connective with the cold-water chamber 37 and the circumferential places 40 and 40'.

Registering with the said circumferential places formed in the emitting-valve 31 are formed four chambers in the sleeve 30, two of which, mixing chambers 104 and 104', are adapted to receive the hot and cold-water flow from the said circumferential places, to maintain a pressure head equal to that obtaining in the said circumferential places and thereby negate the turning resistance of the emitting-valve incident to a differential fluid-flow. The chambers 105 and 105' serve as stabilizers to the said emitting-valve. The functioning flow-openings between the said emitting-valve and the mixing chambers 104 and 104' are so limited that a small reciprocating rotary motion is imparted to the said emitting-valve in the absence of chambers 105 and 105'.

Attention is directed to the one piece equalizing-member. It is observed that the initial inflow of water is from opposite directions to prevent "side-binding" of the said member; that the water enters chambers 23 and 24 formed in the said member and may therefore be carried up or down without encountering resistance therefrom. The outlets 95 and 98 to chambers 20 and 20' transfer pressure to its ends. When the pressure at either end is greater the said emitting-valve, moving in response thereto, tends to limit the area of its outlet, thus establishing a balance of the pressure obtaining in the channels 94 and 97. Should the pressure of the cold water cease, the pressure of the hot water would press the said equalizing-member downward and thus practically close off the hot water. Inasmuch as the completely shutting off of the hot water by the said equalizing-member and also the emitting-valve, is found impractical, the hot-water safety-valve 83 is therefore introduced, which eliminates the possibility of burns caused even from consequent drops following the closing off of the control-valve 79.5.

Suitably designed screens 106 are removably mounted in the said screen chambers, which are fluid-tightly inclosed by covers 107. The top of the said mixing-valve is provided with a leak-proof cover 108.

When installed for operation, the hot water pipe 109 and the cold water pipe 110 being connected, the control-valve 79.5 is interposed in the cold water inlet line 110, with which to manipulate the functioning of the said mixing-valve.

A shower-bath pipe (not shown) is connected to the outlet 72. No valve is required in the hot-water line, as the flow from the said mixing-valve is caused and regulated by the valve, referred to, in the cold-water line. When the cold-water valve is opened the flow therethrough enters passage 78, thence to screen-chamber 74, pressing inwardly the piston 86 and thereby opening the hot-water safety-valve 83 to admit the flow of hot water from the screen-chamber 73. The cold water leaving the screen-chamber 74 via inlet 93 enters channel 92, thence via inlets 101 and 101' to chamber 24, thence via inlet 98 to channel 97 and via inlet 99 to chamber 20'. From channel 97 the flow enters inlets 103 and 103' formed in the sleeve 30 and thence to chamber 37 and via openings 41 and 41' to the circumferential places 40 and 40', thence to chambers 104 and 104'. From the said chambers, via the series of inlet openings 43, the flow enters opening 42 and thence to the exit-chamber 47 via the plurality of outlets 44.

Hot water, flowing in the hot-water pipe, enters the said mixing-valve at the inlet 79 and thence to the screen-chamber 73 via passage 77 and to channel 91 via the hot-water safety-valve 83, thence via inlets 100 and 100' to chamber 23. From chamber 23 the flow, via inlet 95, passes to channel 94 and via inlet 96 to chamber 20. From channel 94, via inlets 102 and 102', the hot-water flow enters chamber 36, thence via openings 39 and 39' to the circumferential places 38 and 38', thence to chambers 104 and 104'. From the said chambers, via the series of inlet openings 43, the flow enters the opening 42 and thence to the exit-chamber 47 via the plurality of outlets 44. It will be noted that the emitting-member 31, which establishes and maintains an elective degree of temperature functions entirely without friction except that minimum amount attributable to the guides 32 and 33; and that the only friction encountered by the thermostatic-member 48 is that caused by the limited surface engaged by the bearing-member 53. It is further recalled that the construction provides a movement of the said emitting-valve of but a few thousandths of an inch to insure constancy of temperature, and that the equalizing-member, which is practically frictionless, is adapted to motion solely by counter-pressures and gravitation.

Having illustrated and described the invention so that, it is believed, any one skilled in the art to which is appertains may understand and produce it, the applicant prays protection which comprehends the essentials of the device as disclosed in the drawings and specification, and enunciated in the following claims.

I claim:

1. In a fluid mixing valve, a body member adapted to receive hot and cold fluid flow, an equalizing control valve in which a variation in cold fluid pressure causes a variation in hot fluid flow and vice versa, a valvular emitting member thermostatically controlled in response to mixed fluid temperature change, a hot water safety valve having a seat in the hot water flow and adapted to shut off hot water flow, an actuating member for said safety valve in the cold water flow, means associated with said safety valve so constructed that the effect of cold water pressure on said safety valve is substantially greater than the effect of hot water pressure, whereby when there is cold water pressure the safety valve is opened and hot water may flow and should the supply of cold water substantially fail and the cold water pressure drop the safety valve will close and shut off hot water flow.

2. In a fluid mixing valve, a body member having inlets for hot and cold fluids and an outlet, said body member adapted to receive hot and cold water conduits, an equalizing control valve in which a variation in cold fluid pressure causes a variation in hot fluid flow and vice versa, a movable emitting member thermostatically controlled in response to mixed fluid temperature change, a hot water safety valve having a seat in the hot water conduit and adapted to shut off hot water flow, an actuating member for said valve in the cold water conduit, means associated with said safety valve whereby the effect of cold water pressure on said safety valve is substantially greater than the effect of hot water pressure, whereby when there is cold water pressure the safety valve is opened and hot water may flow and should the supply of cold water substantially fail and the cold water pressure drop the safety valve will close and shut off hot water flow.

3. The combination set forth in claim 1, said safety valve having a plunger in said hot water flow and a piston in said cold water flow, the area of said piston exceeding that of the plunger.

4. The combination set forth in claim 1, said safety valve having a seating portion and actuating piston means connected by a stem, said seating portion in said hot water flow and said piston means in said cold water flow, the area of said actuator piston means substantially exceeding that of the seating portion.

5. The combination set forth in claim 1, said valvular emitting member having hot and cold fluid conduits therein and a mixing chamber associated therewith and controlling means whereby said conduits are placed in communication with said mixing chamber and deliver fluid of a desired resultant temperature.

6. In combination, an annular member having two pairs of diametrically opposed openings, a thermostatically controlled central member rotatably mounted and in fluid sealing contact with the inner wall of said annular member, said central member rotating in response to a small resultant force, the outer wall of said central member having two pairs of oppositely disposed indentations to provide a passage for hot fluid and a passage for cold fluid and arranged in such a manner that rotation of said central member causes the passages to communicate with the openings in said annular member, one pair of which deliver fluid and the other pair serving as a balancing means to neutralize the rotative force of fluid flow.

7. In combination, a valvular sleeve member having two pairs of openings, the openings of each pair being diametrically opposed, one pair of openings serving as a fluid mixing chamber and the other pair serving as force balancing means, a core element fitting within said sleeve and having pairs of fluid passages corresponding to the said pairs in said sleeve and adapted to be placed in communication therewith, said core element and said sleeve being capable of rotational movement with respect to each other, relative movement of said valvular sleeve and said core element being thermostatically controlled.

JOSEPH MARION KING.